(12) United States Patent
Schmitz et al.

(10) Patent No.: US 10,800,296 B2
(45) Date of Patent: Oct. 13, 2020

(54) SEAT RECLINER ASSEMBLY WITH HOLLOW CROSS MEMBER

(71) Applicant: FISHER & COMPANY, INCORPORATED, St. Clair Shores, MI (US)

(72) Inventors: Ralph L. Schmitz, Clinton Township, MI (US); Jacob P. Hellrung, Grosse Pointe Farms, MI (US); Henry Alexander Braddock, III, Sawyer, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 0 days.

(21) Appl. No.: 15/661,074

(22) Filed: Jul. 27, 2017

(65) Prior Publication Data

US 2018/0056819 A1    Mar. 1, 2018

Related U.S. Application Data

(60) Provisional application No. 62/380,629, filed on Aug. 29, 2016.

(51) Int. Cl.
*B60N 2/235* (2006.01)
*B60N 2/20* (2006.01)

(52) U.S. Cl.
CPC ............. *B60N 2/2356* (2013.01); *B60N 2/20* (2013.01); *B60N 2/236* (2015.04); *B60N 2205/50* (2013.01)

(58) Field of Classification Search
CPC ......... B60N 2/2356; B60N 2/236; B60N 2/20

USPC ........................................... 297/463.1, 463.2
See application file for complete search history.

(56) References Cited

U.S. PATENT DOCUMENTS

| | | |
|---|---|---|
| 343,025 A | 6/1886 | Gordon |
| 910,192 A | 1/1909 | Grouvelle |
| 4,218,092 A | 8/1980 | Schach et al. |
| 4,223,586 A | 9/1980 | Miller |
| 4,451,966 A | 6/1984 | Lee |
| 4,509,806 A | 4/1985 | Dudouyt |
| D285,119 S | 8/1986 | Krautz |
| 4,698,896 A | 10/1987 | Osterwald et al. |
| D325,801 S | 4/1992 | Fasth |

(Continued)

OTHER PUBLICATIONS

Office Action regarding U.S. Appl. No. 15/437,877, dated Dec. 31, 2018.

*Primary Examiner* — Anthony D Barfield
(74) *Attorney, Agent, or Firm* — Harness, Dickey & Pierce, P.L.C.

(57) ABSTRACT

A seat recliner assembly for a vehicle may include first and second recliner hearts, a hand lever, and a cross member. The first recliner heart may be mounted to a bracket. The second recliner heart may be mounted to another bracket. The hand lever may be mounted to the first recliner heart and may be rotatable relative to the brackets to move the first recliner heart between a locked state and an unlocked state. The cross member may be connected to the first and second recliner hearts and may transmit torque from the hand lever to the second recliner mechanism to move the second recliner heart with the first recliner heart between the locked and unlocked states. The cross member may include an aperture extending through an entire longitudinal length of the cross member.

14 Claims, 7 Drawing Sheets

(56) References Cited

U.S. PATENT DOCUMENTS

| | | | |
|---|---|---|---|
| 5,158,389 A | 10/1992 | Osterwald et al. | |
| D415,847 S | 10/1999 | Schaefer | |
| 6,007,153 A | 12/1999 | Benoit et al. | |
| 6,161,899 A | 12/2000 | Yu | |
| 6,283,159 B1 | 9/2001 | Tada | |
| 6,390,557 B1 | 5/2002 | Asano | |
| 6,836,951 B2 | 1/2005 | Dudash et al. | |
| D503,645 S | 4/2005 | Wirth et al. | |
| 7,014,265 B2 | 3/2006 | Yamada et al. | |
| 7,503,099 B2 | 3/2009 | Pejathaya | |
| 7,513,573 B2 | 4/2009 | Wahls et al. | |
| 7,871,128 B2 | 1/2011 | Bonk et al. | |
| D666,330 S | 8/2012 | Stamper | |
| 9,108,541 B2 * | 8/2015 | Assmann | B60N 2/2356 |
| D745,299 S | 12/2015 | Chang | |
| D764,140 S | 8/2016 | Holzhaeuser | |
| D786,172 S | 5/2017 | Komazaki et al. | |
| D787,421 S | 5/2017 | Komazaki et al. | |
| D788,018 S | 5/2017 | Komazaki et al. | |
| 9,751,432 B2 * | 9/2017 | Assmann | B60N 2/2356 |
| D809,994 S | 2/2018 | Braddock III | |
| 2002/0014797 A1 | 2/2002 | Dudash et al. | |
| 2008/0073961 A1 | 3/2008 | Wahls et al. | |
| 2012/0261976 A1 | 10/2012 | Uebelacker et al. | |
| 2012/0306251 A1 | 12/2012 | Arefi et al. | |
| 2013/0233435 A1 | 9/2013 | Henthorn et al. | |
| 2014/0232163 A1 | 8/2014 | Eckhoff et al. | |
| 2015/0273548 A1 | 10/2015 | Tanoue et al. | |
| 2017/0058940 A1 | 3/2017 | Wehner et al. | |
| 2018/0238474 A1 | 8/2018 | Braddock, III | |

* cited by examiner

SEAT RECLINER ASSEMBLY WITH HOLLOW CROSS MEMBER

CROSS-REFERENCE TO RELATED APPLICATIONS

This application claims the benefit of U.S. Provisional Application No. 62/380,629, filed on Aug. 29, 2016. The entire disclosure of the above application is incorporated herein by reference.

FIELD

The present disclosure relates to a seat recliner assembly with a hollow cross member.

BACKGROUND

This section provides background information related to the present disclosure and is not necessarily prior art.

Vehicle seats typically include a seat recliner assembly that allows selective adjustment of an angular position of a seatback relative to a seat bottom. Such seat recliner assemblies may include a pair of recliner mechanisms disposed at opposite ends of a base of the seatback to maintain torsional stiffness of the seatback when the seatback is in a locked position. Because each recliner mechanism maintains the seatback in the locked position, each recliner mechanism must be moved from a locked state into an unlocked state to permit movement of the seatback relative to the seat bottom. Because a single release handle is often employed to release both recliner mechanisms, both of the recliner mechanisms must be synchronized to lock and release simultaneously.

Such synchronization is often accomplished using a cross member that extends between the two recliner mechanisms and may transmit torque from the release mechanism to the recliner mechanisms. Typically, such cross members are solid metal rods having an axial end with a threaded aperture that allows the release handle to be secured to the cross member by a threaded fastener. Such solid cross members are quite expensive to produce. The present disclosure provides an improved cross member that is less expensive to produce and weighs less than conventional cross members while maintaining satisfactory performance.

SUMMARY

This section provides a general summary of the disclosure, and is not a comprehensive disclosure of its full scope or all of its features.

The present disclosure provides a vehicle seat recliner assembly that may include first and second recliner hearts, a hand lever, and a cross member. The first recliner heart may be mounted to a bracket. The second recliner heart may be mounted to another bracket. The hand lever may be mounted to the first recliner heart and rotatable relative to the brackets to move the first recliner heart between a locked state and an unlocked state. The cross member may be connected to the first and second recliner hearts and transmitting torque from the hand lever to the second recliner heart to move the second recliner heart with the first recliner heart between the locked and unlocked states. The cross member may include an aperture extending through an entire longitudinal length of the cross member.

In some configurations, the cross member includes a plurality of outer surfaces each having one of a plurality of grooves formed thereon.

In some configurations, the cross member includes a plurality of lobes that define the aperture.

In some configurations, the lobes extend inward toward a center of the aperture.

In some configurations, each of the lobes is aligned with a corresponding one of the grooves on a corresponding one of the outer surfaces.

In some configurations, the vehicle seat recliner assembly includes fastener extending through the hand lever and threadably engaging the lobes.

In some configurations, the fastener includes a threaded shaft having a main body and a tapered tip. The main body may include a reduced-diameter portion disposed axially between axial ends of the main body. The fastener may include an adhesive patch wrapped around the reduced-diameter portion.

In some configurations, the fastener includes a threaded shaft and a head including a plurality of ribs. The head includes an underside from which the threaded shaft extends. The plurality of ribs may be disposed on the underside of the head and may extend radially between the threaded shaft and an outer periphery of the head.

In some configurations, the cross member includes a weld seam spanning the longitudinal length of the cross member.

In some configurations, the weld seam is located on one of the outer surfaces and is spaced apart from threads formed on the lobes.

In some configurations, the cross member has a rectangular outer profile.

In some configurations, each of the first and second recliner hearts includes a cam and a plurality of locking pawls. The cams may be engaged with the locking pawls such that rotation of the cams causes corresponding movement of the locking pawls into and out of engagement with teeth of a ratchet plate. The cross member may be coupled (directly or indirectly) to the cams such that the cams rotate together with the cross member.

The present disclosure also provides a vehicle seat assembly that may include a seat bottom, a seatback, first and second recliner hearts, a hand lever, and a cross member. The seatback may be mounted to the seat bottom and rotatable relative to the seat bottom between a reclined position and an upright position. The first recliner heart mounted to a first lateral side of the seat bottom and the seatback. The second recliner heart may be mounted to a second lateral side of the seat bottom and the seatback. The hand lever may be mounted to the first recliner heart and rotatable relative to the seat bottom to move the first recliner heart between a locked state and an unlocked state. The cross member connected to the first and second recliner hearts and transmitting torque from the hand lever to the second recliner heart to move the second recliner heart with the first recliner heart between the locked and unlocked states. The cross member may include an aperture extending through an entire longitudinal length of the cross member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
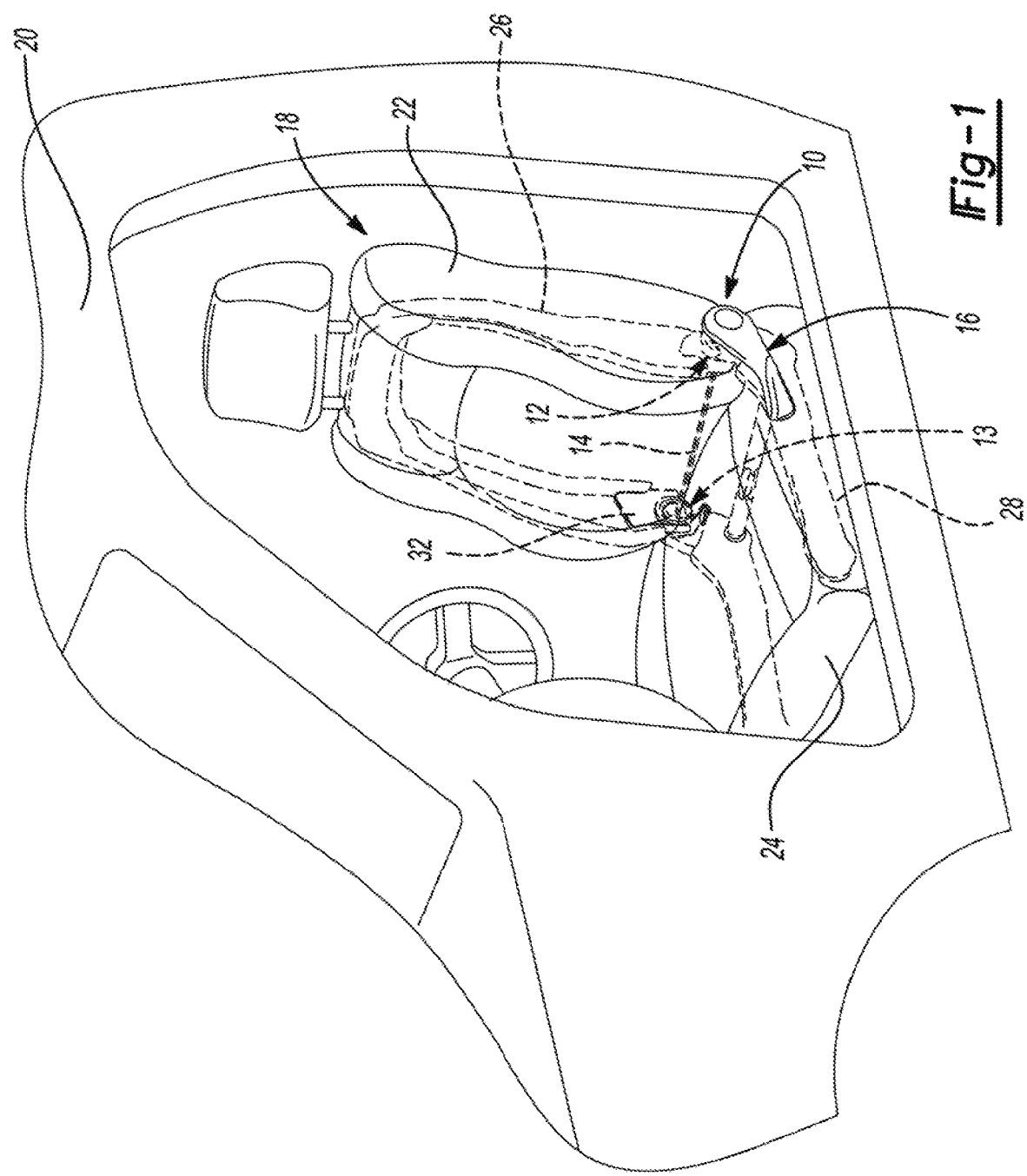
FIG. 1 is a partial perspective view of a vehicle having a seat incorporating a recliner assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
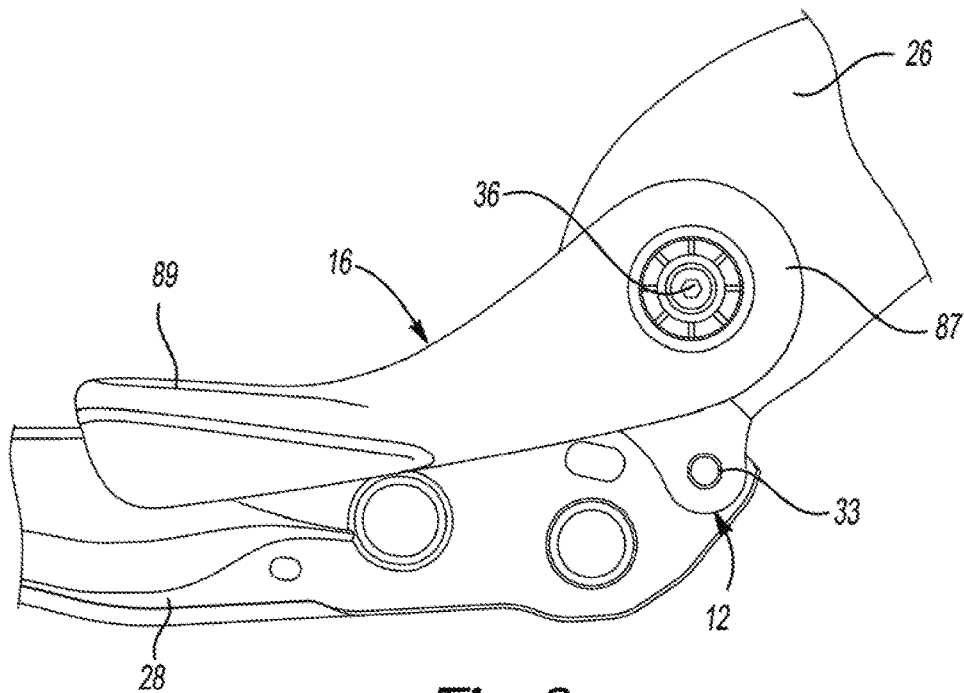
FIG. 2 is a side view of the recliner assembly of FIG. 1 with the seat in a reclined position.
Figure 3:
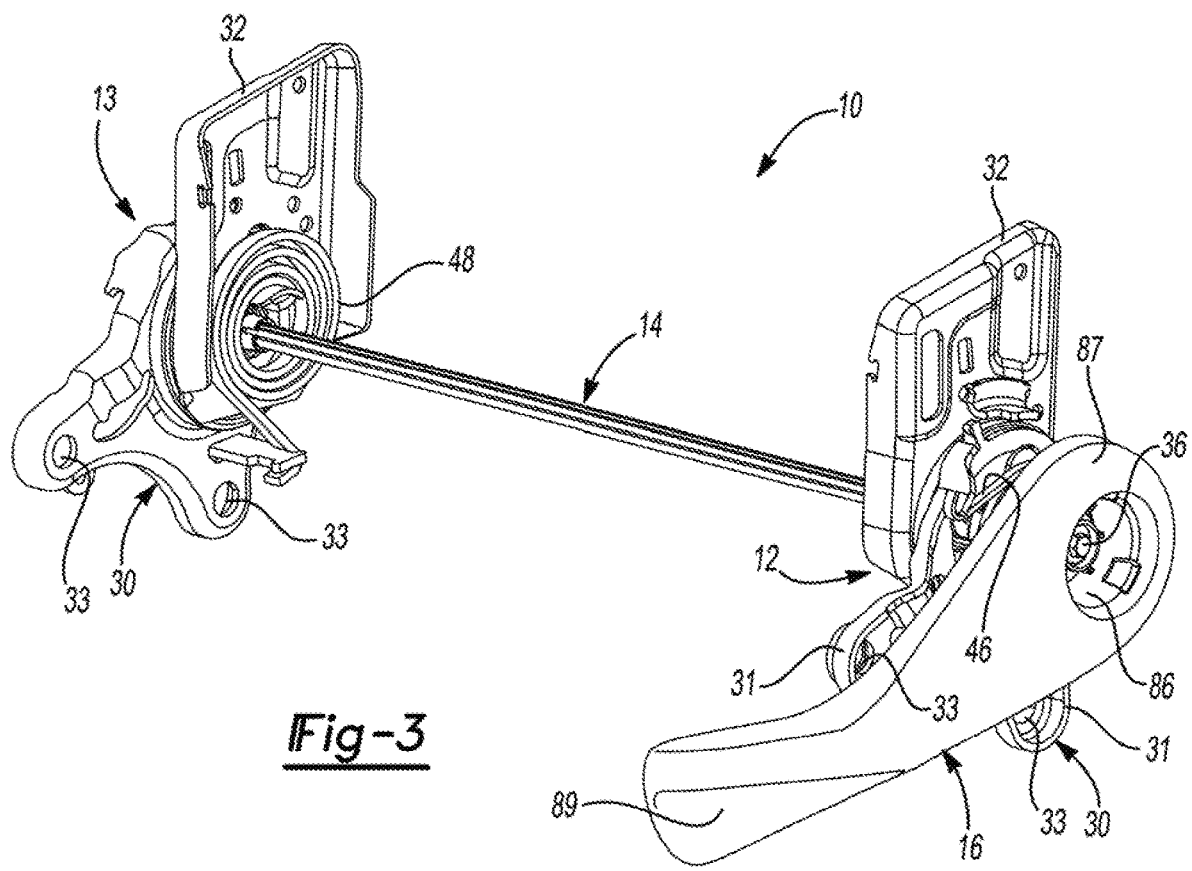
FIG. 3 is a perspective view of the recliner assembly of FIG. 1.

With reference to FIGS. 1-3, a recliner assembly 10 is provided that may be incorporated into a vehicle seat assembly 18 having a seatback 22 and a seat bottom 24. The seatback 22 and seat bottom 24 may include a seatback frame 26 and a seat bottom frame 28 respectively. The seat assembly 18 may be positioned in a vehicle 20, as shown in FIG. 1. The recliner assembly 10 may include a first recliner mechanism 12, a second recliner mechanism 13, a cross member 14, and a hand lever 16 (or release lever).

Figure 5:
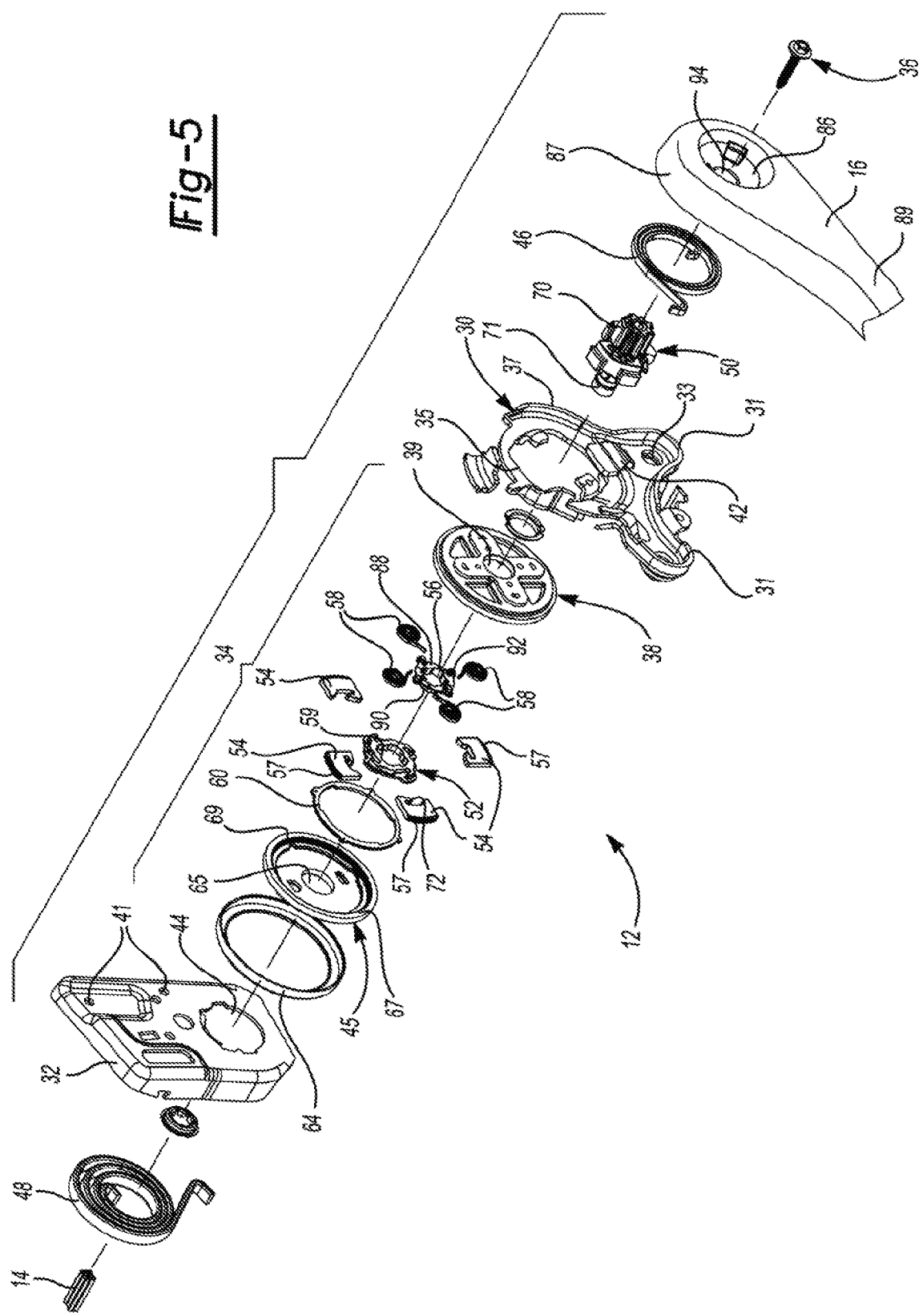
FIG. 5 is an exploded view of a portion of the recliner assembly of FIG. 1.

The first and second recliner mechanisms 12, 13 may be operable in a locked state preventing relative rotation between the seatback 22 and the seat bottom 24 and an unlocked state permitting relative rotation between the seatback 22 and seat bottom 24 among an upright position (FIG. 1), a rearward reclined position (FIG. 2) and a forward dump position (not shown). As shown in FIG. 5, the first recliner mechanism 12 may include a first bracket 30, a second bracket 32, a recliner heart (or locking mechanism) 34, an outer coil spring 46, an inner coil spring 48, and a hub 50.

Figure 4:
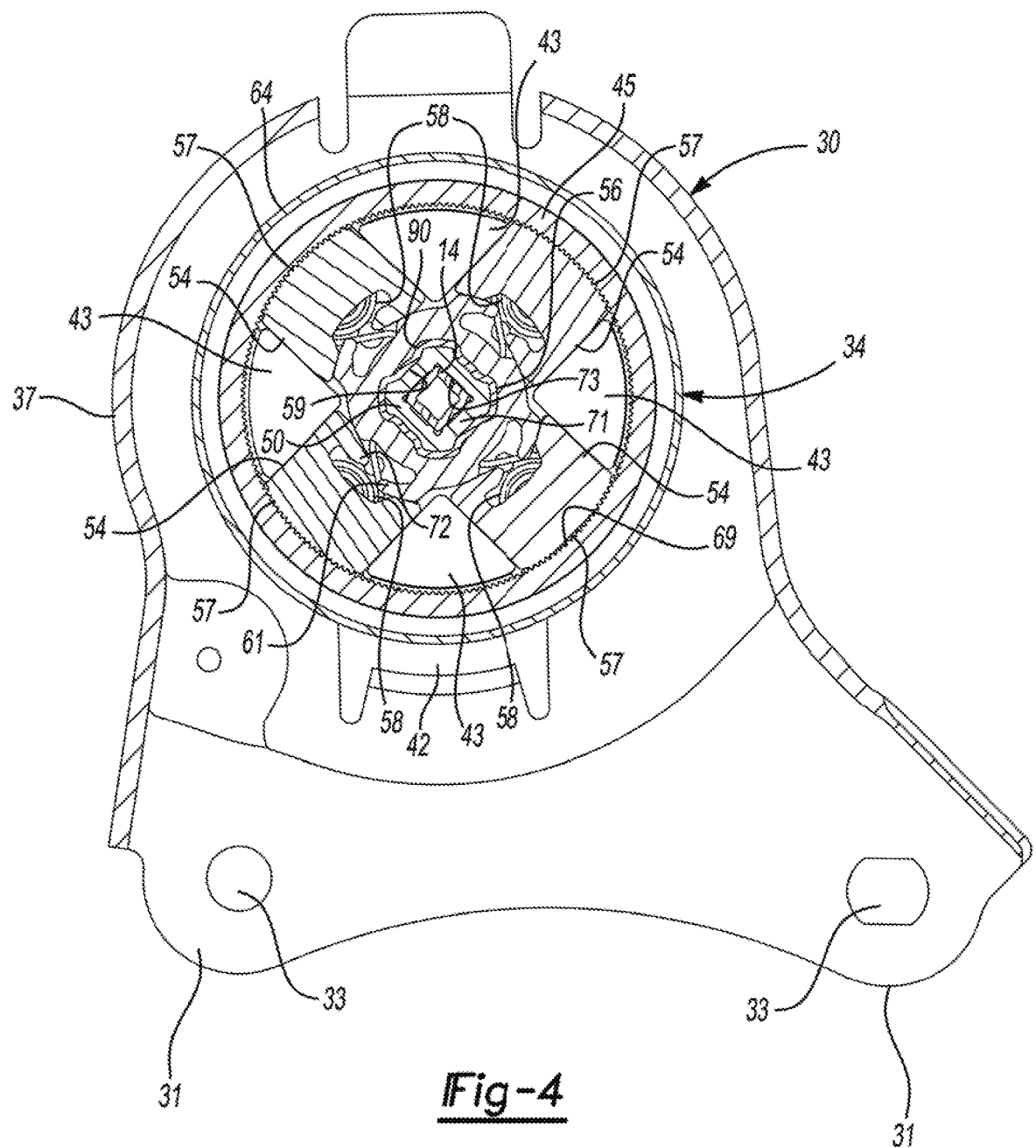
FIG. 4 is a cross-sectional view of a recliner mechanism of the recliner assembly of FIG. 1 in a locked state.

As shown in FIGS. 4 and 5, the first bracket 30 may include a generally round main body 37 and a pair of mounting lobes 31 that extend outward from the main body 37. The main body 37 may include a central aperture 35 and a tab 42. The mounting lobes 31 may include a plurality of apertures 33 through which fasteners (not shown) may extend to securely attach the first bracket 30 to the seat bottom frame 28 of the seat assembly 18.

As shown in FIG. 5, the second bracket 32 may be generally rectangular and may include a plurality of apertures 41, and a central aperture 44 through which the cross member 14 extends. Fasteners (not shown) may extend through the plurality of apertures 41 to securely attach the second bracket 32 to the seatback frame 26 of the seat assembly 18.

With reference to FIG. 5, the recliner heart 34 may be mounted to the first and second brackets 30, 32 and may include a guide plate 38, a ratchet plate 45, a cam 52, a plurality of pawls 54, a connector disk 56, a plurality of coil springs 58, a control ring 60, and an encapsulation ring 64. The recliner heart 34 may be operable to lock the first recliner mechanism 12, thus preventing relative rotation between the seatback 22 and the seat bottom 24, and to also unlock the first recliner mechanism 12, thus permitting relative rotation between the seatback 22 and seat bottom 24.

The guide plate 38 may be mounted to the first bracket 30. The guide plate 38 may be a generally round, flat disk with a central aperture 39 (FIG. 5) and a plurality of bosses 43 (FIG. 4). Each of the pawls 54 is slidably received between corresponding adjacent bosses 43.

The ratchet plate 45 may be a generally round, flat disk and may include a central aperture 65 and a cylindrical recess 67 (FIG. 5). The cylindrical recess 67 may include a plurality of teeth 69 (FIG. 4) disposed on an inner diameter defining the cylindrical recess 67. The second bracket 32 may be welded and/or otherwise suitably fixed to the seatback 22 and the ratchet plate 45 to attach the ratchet plate 45 to the seatback 22. The ratchet plate 45 may be mounted to the guide plate 38 with the cylindrical recess 67 disposed substantially concentric with outer radii of the bosses 43. The encapsulation ring 64 has a U-shaped cross-section and may be disposed generally around the peripheries of the ratchet plate 45 and the guide plate 38 to rotatably couple the ratchet plate 45 to the guide plate 38.

The plurality of pawls 54 may be radially disposed around the central aperture 39 on the guide plate 38 and may be slidably mounted to the guide plate 38 generally between the bosses 43 (FIG. 4). An edge of each pawl 54 may include a plurality of teeth 57 adapted for meshing engagement with the teeth 69 of the ratchet plate 45. Each pawl 54 may also include a latch 72 at an end opposite the teeth 57.

The cam 52 may be a generally round disk having an aperture 59 and a plurality of radial latch protrusions 61 arranged around the aperture 59. The cam 52 is rotatable relative to the pawls 54 and the ratchet plate 45 such that the latch protrusions 61 can selectively engage the latches 72 of the pawls 54 to move the pawls 54 out of engagement with the teeth 69 of the ratchet plate 45 (i.e., into the unlocked state).

The connector disk 56 is engaged with the cam 52 and the hub 50. As shown in FIG. 4, the connector disk 56 may include a disk portion 88 and an extrusion 90 extending perpendicularly from the disk portion 88. The disk portion 88 may have a plurality of flanges 92 extending therefrom. Each flange 92 is engaged with a corresponding one of the coil springs 58. Because each flange 92 is engaged to the corresponding spring 58, the connector disk 56 rotationally biases the cam 52 in a manner that causes the latch protrusions 61 to force the pawls 54 radially outwardly into the locked state, whereby the teeth 57 of the pawls 54 engage the teeth 69 of the ratchet plate 45.

The extrusion 90 of the connector disk 56 is engaged with the hub 50 and the cam 52 such that rotation of the hub 50 (which is caused by rotation of the hand lever 16) causes rotation of the cam 52 to move the pawls 54 radially into and out of engagement with the teeth 69 of the ratchet plate 45.

The outer coil spring 46 may exert a torsional force that biases the first recliner mechanism 12 toward a locked state. The outer coil spring 46 may wrap around the hub 50 and engage the first bracket 30 and the hand lever 16. The inner coil spring 48 may extend around the cross member 14 and may engage the first and second brackets 30, 32 to rotationally bias the seatback 22 toward the upright position relative to the seat bottom 24.

The hub 50 may extend through the length of the recliner heart 34 and may include a first end 70 and a second end 71. The first end 70 may engage the hand lever 16 such that the hub 50 and the hand lever 16 are rotationally fixed to each other. A fastener 36 (e.g., a screw; shown in FIGS. 2, 3 and 5) may extend through the hand lever 16 and threadably engage the first end 70 of the hub 50. The second end 71 may include an aperture 73 (FIG. 4) that receives and end of the cross member 14. The cross-sectional shape of the aperture 73 generally corresponds to the cross-sectional shape of the cross member 14 such that the cross member 14 and the hub 50 are rotationally fixed relative to each other. To enable the seatback 22 to pivot relative to the seat bottom 24, a user may pivot the hand lever 16 in a clockwise direction (relative to the view shown in FIG. 4) thus rotating the hub 50 (and consequently the cross member 14). Accordingly, clockwise rotation of the cross member 14 causes the cam 52 to similarly rotate in a clockwise direction relative to the plurality of pawls 54, overcoming a counterclockwise rotational bias of the outer coil spring 46.

The structure and function of the second recliner mechanism 13 may be similar or identical to that of the first recliner mechanism 12 and, therefore, will not be described again in detail.

Figure 6:
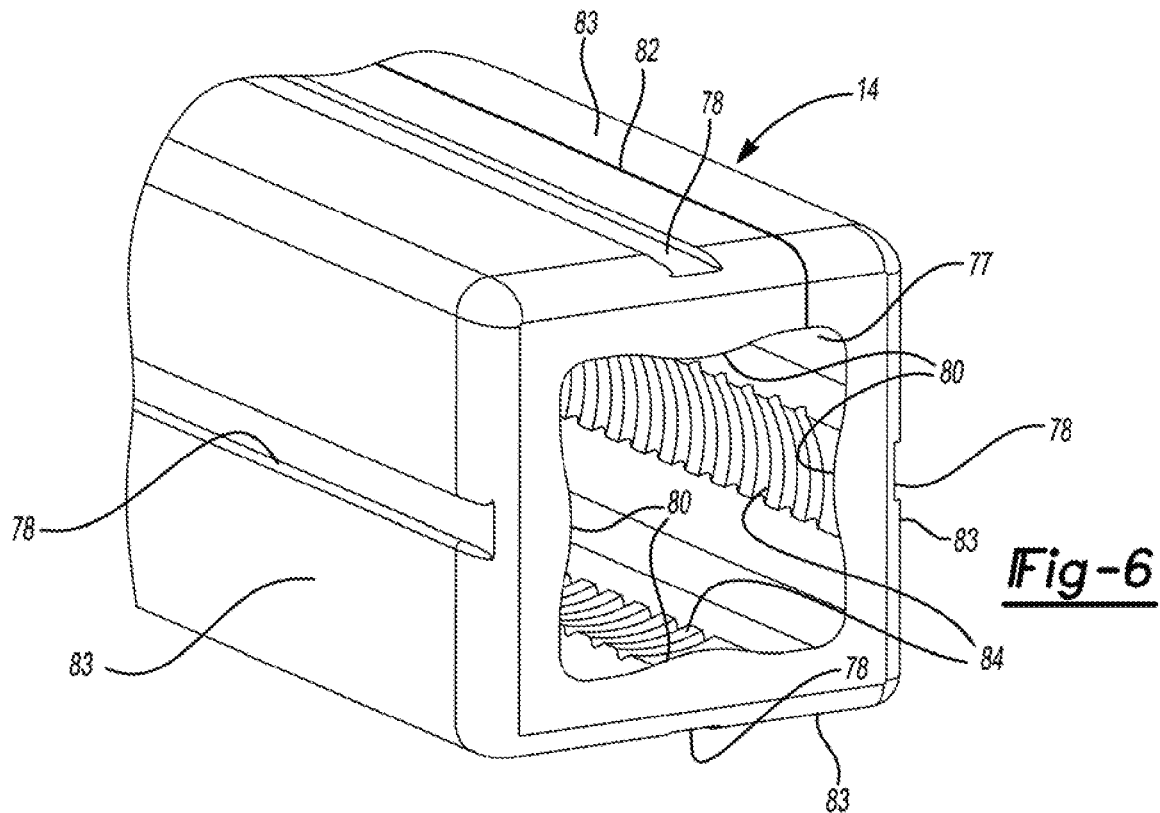
FIG. 6 is a partial perspective view of a cross member of the recliner assembly of FIG. 1.
Figure 7:
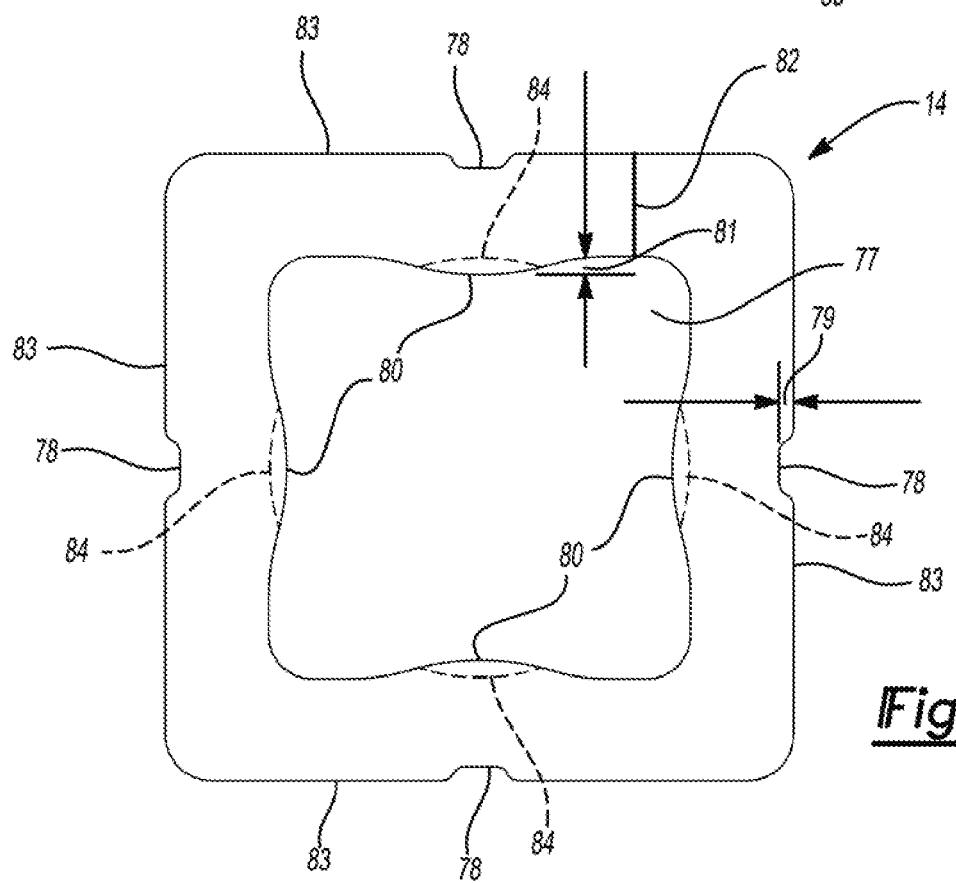
FIG. 7 is an end view of the cross member of FIG. 6.
Figure 8:
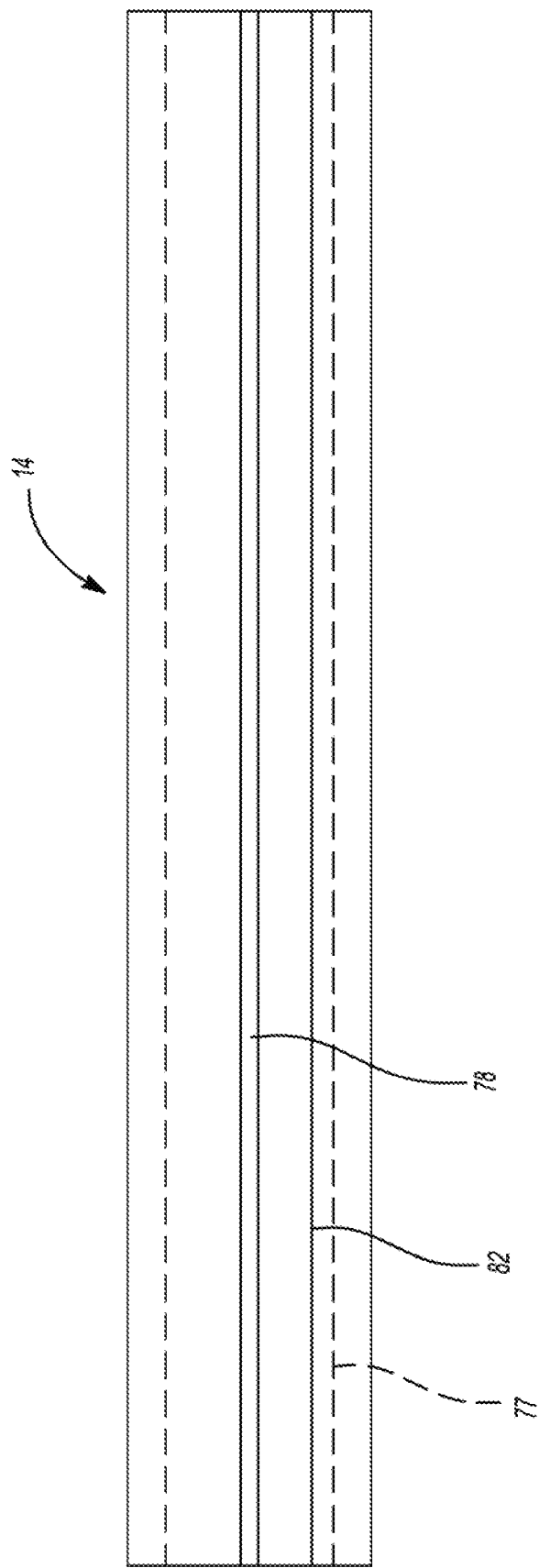
FIG. 8 is a side view of the cross member.

With reference to FIGS. 6-8, the cross member 14 may be a hollow tube with a generally rectangular (e.g., square) profile and may extend in a cross-vehicle direction. The cross member 14 may connect the first recliner mechanism 12 to the second recliner mechanism 13, and may transmit rotational motion of the first recliner mechanism 12 to the second recliner mechanism 13 to move the second recliner mechanism 13 between the locked and unlocked states simultaneously with motion of the first recliner mechanism 12 between the locked and unlocked states. That is, the cross member 14 transmits torque from the hand lever 16 to the second recliner mechanism 13.

The cross member 14 may include a central aperture 77, a plurality of grooves 78, a plurality of lobes 80, and a weld seam 82. As shown in FIG. 8, the central aperture 77 extends through the entire longitudinal length of the cross member 14 (thereby giving the cross member 14 the hollow tubular construction). Similarly, the weld seam 82 spans the entire longitudinal length of the cross member 14. In some configurations, the grooves 78 and lobes 80 may span the entire longitudinal length of the cross member 14. In other configurations, grooves 78 and lobes 80 may be formed only in portions of the longitudinal length (i.e., portions at one or both longitudinal ends of the cross member 14).

The cross member 14 includes a plurality of outer surfaces 83 that cooperate to form the generally square or rectangular outer periphery of the cross member 14. Each of the plurality of grooves 78 may be formed in a corresponding one of the surfaces 83 at a substantially central location of the face 83. The plurality of grooves 78 have a depth 79 extending toward the center of the aperture 77.

The grooves 78 can be formed by deforming the surfaces 83 such that the lobes 80 are formed during the deformation process. That is, when a deformation tool (not shown) is pressed into the outer surfaces 83 to form the grooves 78, the deformation forms the lobes 80, which extend inward toward the center of the aperture 77. The plurality of lobes 80 may be partially defined by a height 81. The height 81 of the plurality of lobes 80 is dependent upon the amount of material displaced to achieve the depth 79 of the grooves 78. Threads 84 may be formed into each of the plurality of lobes 80. The threads 84 can be formed by a tap (not shown) before assembly of the recliner assembly 10, or the threads 84 can be formed by the fastener 36 (e.g., a self-tapping screw) as the fastener 36 is driven into the aperture 77 during assembly of the recliner assembly 10. The depth 79 of the grooves 78, and, thus, the height 81 of the lobes 80, may be adjusted so that when a specific screw-in torque of the fastener 36 is met, the plurality of lobes 80 may halt a rotational motion of the fastener 36. The weld seam 82 may be located in a position where the threads 84 are not present (i.e., so that the weld seam 82 does not extend into any of the threads 84) to reduce the risk of crack or separation of the cross member 14.

The hollow tubular construction of the cross member 14 makes the cross member 14 significantly less expensive to produce and lighter weight than conventional solid cross members with drilled holes at the ends while maintaining sufficient strength and rigidity. Furthermore, forming the inner dimensions of the cross member 14 (e.g., the locations and heights 81 of the lobes 80) by forming the grooves 78 in the outer surfaces 83 of the cross member 14 allows the inner dimensions to be tightly controlled without affecting the outer dimensions (i.e., the overall outer length, width and height) of the cross member 14. Furthermore, the tubular design allows the cross member 14 to be able to accept fasteners of any length. The shape and location of the lobes 80 apply a preload torque on the fasteners 36 upon installation of the fasteners 36. The lobes 80 allow for a slightly larger diameter fastener to be used to reassemble the recliner assembly 10 after slightly smaller diameter fasteners 36 are removed to disassemble the recliner assembly 10 for service operations.

As shown in FIG. 3, the hand lever 16 may include a hub portion 87 and a handle portion 89. The hub portion 87 may include a recess 86. The recess 86 may include an aperture 94 (FIG. 5) through which the fastener 36 extends. The handle portion 89 may extend outward from the hub portion 87 and may be shaped to provide a comfortable gripping surface that a user can grip to actuate the hand lever 16. The hand lever 16 may be securely attached to the first end 70 of the hub 50, so that a rotational movement of the hand lever 16 causes the hub 50 (and consequently the cross member 14) to rotate. This rotational movement may function to lock and unlock the seat recliner mechanisms 12, 13 to selectively prevent and allow rotational motion of the seatback 22 relative to the seat bottom 24.

The fastener 36 may include a threaded shaft 66 and a head 68. The shaft 66 may be sized to extend through the hub 50 and engage the threads 84 of the cross member 14. The head 68 has a larger diameter than the aperture 94 in the hand lever 16. The fastener 36 may be capable of creating the threads 84 on the plurality of lobes 80. That is, the threads 84 may be formed by driving the fastener 36 into the center of the aperture 77 of the cross member 14. The fastener 36 may have a specific screw-in torque, and when this torque specification is met, the fastener 36 may stop creation of the thread 84. The height 81 of the plurality of lobes 80 may be sized to halt the torsional motion of the fastener 36 when the specific screw-in torque is met.

Figure 9:
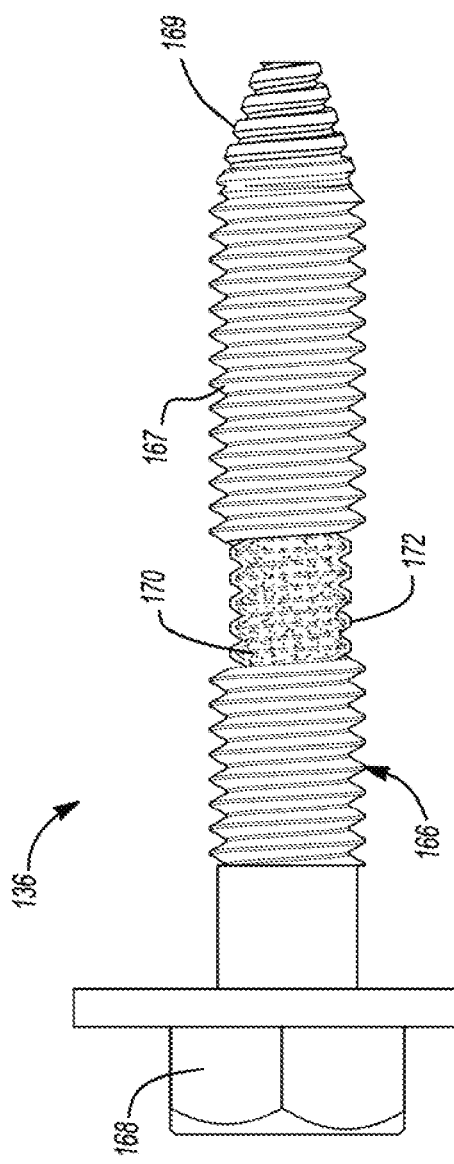
FIG. 9 is a side view of a fastener that can be incorporated into the recliner assembly.

Referring now to FIG. 9, another fastener 136 is provided that can be incorporated into the recliner assembly 10 instead of the fastener 36. Like the fastener 36, the fastener 136 may extend through the aperture 94 in the handle 16 and the hub 50 and may threadably engage the aperture 77 of the cross member 14. Furthermore, the threads 84 may be formed by driving the fastener 136 into the center of the aperture 77 of the cross member 14, as described above with respect to the fastener 36.

The fastener 136 includes a threaded shaft 166 and a head 168. The threaded shaft 166 may include a main body 167 and a tapered tip 169 extending from an axial end of the main body 167. The shaft 166 and head 168 may be similar or identical to the shaft 66 and head 68 of the fastener 36, except the shaft 166 may include a recessed portion (i.e., a reduced-diameter portion) 170 disposed axially between axial ends of the main body. The recessed portion 170 includes threads having a slightly smaller outer diameter than the rest of the threads on the main body 167 on both sides of the recessed portion 170. An adhesive patch 172 may be applied around the threads of the recessed portion 170. The material of the adhesive patch 172 may be thin enough so that the outer diameter of the threads with the adhesive patch 172 disposed thereon is still smaller than the outer diameter of the rest of the threads of the main body 167 on both sides of the recessed portion 170.

When the fastener 136 is driven in the aperture 77 of the cross member 14, the adhesive patch 172 may adhesively bond the threads of the fastener 136 to the threads 84 of the cross member 14, thereby locking the fastener 136 relative to the cross member 14. The reduced diameter of the recessed portion 170 provides enough clearance between the adhesive patch 172 and the threads 84 of the cross member 14 so that when the threads 84 are being formed in the cross member 14, the material of the adhesive patch 172 does not get pushed into the corners of the aperture 77 between the threads 84.

Figure 11:
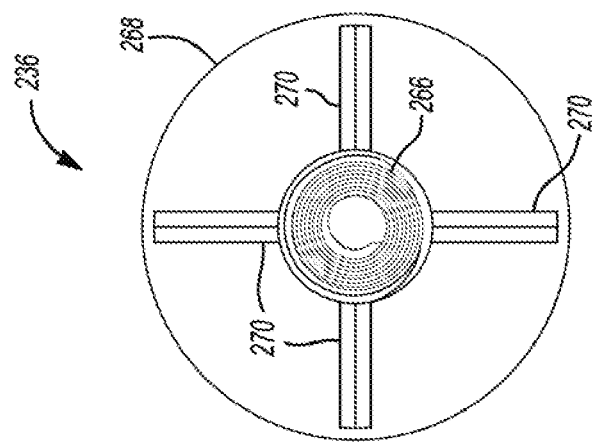
FIG. 11 is an end view of the fastener of FIG. 10.
Figure 10:
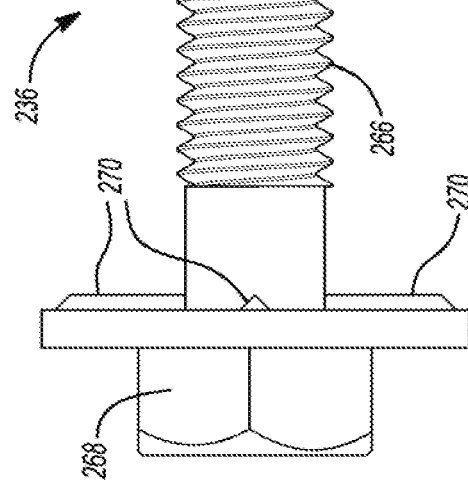
FIG. 10 is a side view of another fastener that can be incorporated into the recliner assembly.

Referring now to FIGS. 10 and 11, another fastener 236 is provided that can be incorporated into the recliner assembly 10 instead of the fastener 36. Like the fastener 36, the fastener 236 may extend through the aperture 94 in the handle 16 and the hub 50 and may threadably engage the aperture 77 of the cross member 14. Furthermore, the threads 84 may be formed by driving the fastener 236 into the center of the aperture 77 of the cross member 14, as described above with respect to the fastener 36.

The fastener 236 includes a threaded shaft 266 and a head 268. The shaft 266 and head 268 may be similar or identical to the shaft 66, 166 and head 68, 168 of the fastener 36, 136, except an underside of the head 268 adjacent the shaft 266 may include a plurality of raised ribs 270. The ribs 270 may extend radially from the shaft 266 to the outer periphery of the head 268. When the fastener 236 is installed into the recliner assembly 10, the ribs 270 may embed into the plastic material of the handle 16, thereby locking the fastener 236 relative to the handle 16.

In some configurations, the fastener 236 may include the recessed portion 170 and adhesive patch 172 described above with respect to the fastener 136.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle seat recliner assembly comprising:
   a first recliner heart mounted to a bracket;
   a second recliner heart mounted to another bracket;

a hand lever mounted to the first recliner heart and rotatable relative to the brackets to move the first recliner heart between a locked state and an unlocked state; and a cross member connected to the first and second recliner hearts and transmitting torque from the hand lever to the second recliner heart to move the second recliner heart with the first recliner heart between the locked and unlocked states, the cross member having an aperture extending through an entire longitudinal length of the cross member; and a fastener extending through the hand lever, wherein the cross member includes a plurality of outer surfaces each having one of a plurality of grooves formed thereon, wherein the cross member includes a plurality of lobes that define the aperture and extend inward toward a center of the aperture, wherein each of the lobes is aligned with a corresponding one of the grooves on a corresponding one of the outer surfaces, wherein the fastener threadably engages the lobes.

2. The vehicle seat recliner assembly of claim 1, wherein the fastener includes a threaded shaft having a main body and a tapered tip, the main body includes a reduced-diameter portion disposed axially between axial ends of the main body, and wherein the fastener includes an adhesive patch wrapped around the reduced-diameter portion.

3. The vehicle seat recliner assembly of claim 1, wherein the fastener includes a threaded shaft and a head, the head includes an underside from which the threaded shaft extends, and wherein the underside of the head includes a plurality of ribs extending radially between the threaded shaft and an outer periphery of the head.

4. The vehicle seat recliner assembly of claim 1, wherein the cross member includes a weld seam spanning the longitudinal length of the cross member.

5. The vehicle seat recliner assembly of claim 4, wherein the weld seam is located on one of the outer surfaces and is spaced apart from threads formed on the lobes.

6. The vehicle seat recliner assembly of claim 5, wherein the cross member has a rectangular outer profile.

7. The vehicle seat recliner assembly of claim 6, wherein each of the first and second recliner hearts includes a cam and a plurality of locking pawls, the cams are engaged with the locking pawls such that rotation of the cams causes corresponding movement of the locking pawls into and out of engagement with teeth of a ratchet plate, wherein the cross member is coupled to the cams such that the cams rotate together with the cross member.

8. A vehicle seat assembly comprising:

a seat bottom;

a seatback mounted to the seat bottom and rotatable relative to the seat bottom between a reclined position and an upright position;

a first recliner heart mounted to a first lateral side of the seat bottom and the seatback;

a second recliner heart mounted to a second lateral side of the seat bottom and the seatback;

a hand lever mounted to the first recliner heart and rotatable relative to the seat bottom to move the first recliner heart between a locked state and an unlocked state;

a cross member connected to the first and second recliner hearts and transmitting torque from the hand lever to the second recliner heart to move the second recliner heart with the first recliner heart between the locked and unlocked states, the cross member having an aperture extending through an entire longitudinal length of the cross member; and a fastener extending through the hand lever, wherein the cross member includes a plurality of outer surfaces each having one of a plurality of grooves formed thereon, wherein the cross member includes a plurality of lobes that define the aperture and extend inward toward a center of the aperture, wherein each of the lobes is aligned with a corresponding one of the grooves on a corresponding one of the outer surfaces, wherein the fastener threadably engages the lobes.

9. The vehicle seat assembly of claim 8, wherein the fastener includes a threaded shaft having a main body and a tapered tip, the main body includes a reduced-diameter portion disposed axially between axial ends of the main body, and wherein the fastener includes an adhesive patch wrapped around the reduced-diameter portion.

10. The vehicle seat assembly of claim 8, wherein the fastener includes a threaded shaft and a head, the head includes an underside from which the threaded shaft extends, and wherein the underside of the head includes a plurality of ribs extending radially between the threaded shaft and an outer periphery of the head.

11. The vehicle seat assembly of claim 8, wherein the cross member includes a weld seam spanning the longitudinal length of the cross member.

12. The vehicle seat assembly of claim 11, wherein the weld seam is located on one of the outer surfaces and is spaced apart from threads formed on the lobes.

13. The vehicle seat assembly of claim 8, wherein the cross member has a rectangular outer profile.

14. The vehicle seat assembly of claim 8, wherein each of the first and second recliner hearts includes a cam and a plurality of locking pawls, the cams are engaged with the locking pawls such that rotation of the cams causes corresponding movement of the locking pawls into and out of engagement with teeth of a ratchet plate, wherein the cross member is coupled to the cams such that the cams rotate together with the cross member.

* * * * *